(12) United States Patent
Michenfelder et al.

(10) Patent No.: US 6,376,824 B1
(45) Date of Patent: Apr. 23, 2002

(54) OPTICAL SENSOR

(75) Inventors: Gebhard Michenfelder, Lichtenau; Rainer Pientka, Renchen; Guenther Riehl, Buehlertal; Stephanie Lorenz, Baden-Baden; Manfred Burkart, Iffezheim, all of (DE); Klaus Roth, Mondeville (FR); Stephan Schrodt, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,768

(22) PCT Filed: Mar. 11, 1999

(86) PCT No.: PCT/DE99/00665

§ 371 Date: Feb. 15, 2000

§ 102(e) Date: Feb. 15, 2000

(87) PCT Pub. No.: WO99/47396

PCT Pub. Date: Sep. 23, 1999

(30) Foreign Application Priority Data

Mar. 17, 1998 (DE) .......................................... 198 11 529
Aug. 28, 1998 (DE) .......................................... 198 39 273

(51) Int. Cl.$^7$ .............................................. H01L 31/00
(52) U.S. Cl. .............. 250/214 R; 250/574; 250/227.25; 250/341.8

(58) Field of Search .............................. 250/214 R, 574, 250/227.25, 341.8; 318/480, 483

(56) References Cited

U.S. PATENT DOCUMENTS

| | | | | |
|---|---|---|---|---|
| 4,355,271 A | * | 10/1982 | Noack | 318/480 |
| 5,898,183 A | * | 4/1999 | Teder | 250/574 |
| 6,118,383 A | * | 9/2000 | Hegyi | 340/602 |

* cited by examiner

Primary Examiner—Robert H. Kim
Assistant Examiner—Courtney Thomas
(74) Attorney, Agent, or Firm—Michael J. Striker

(57) ABSTRACT

The invention relates to an optical sensor for motor vehicles, for detecting ambient parameters that affect vision, having at least one transmitter and at least one receiver for electromagnetic waves (light waves), in which a windshield is disposed in a measurement segment between the at least one transmitter and the at least one receiver and influences a wave propagation between the at least one transmitter and the at least one receiver in such a way that when a film develops on the windshield, and especially when wetting occurs from precipitation, an output signal generated by the receiver varies and serves to trigger a windshield wiper system. It is provided that at least one of the receivers (16, 20, 22) of the optical sensor (4) receives electromagnetic waves (light waves) of an ambient brightness of the motor vehicle and serves to trigger a light system of the motor vehicle.

27 Claims, 4 Drawing Sheets

Figure 7:
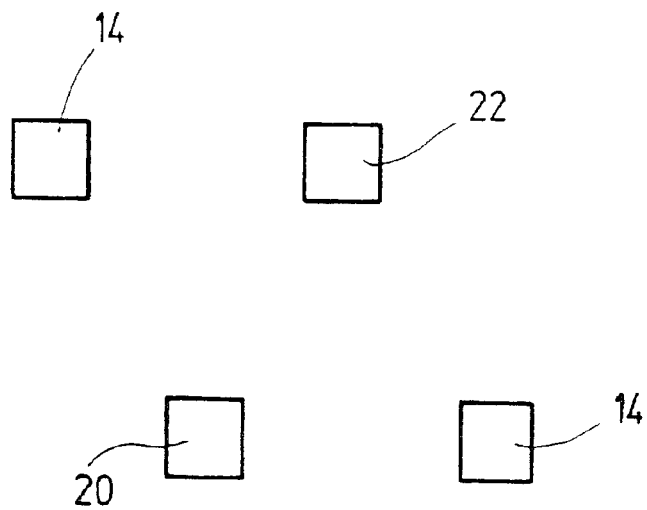

Fig.1
Fig.2
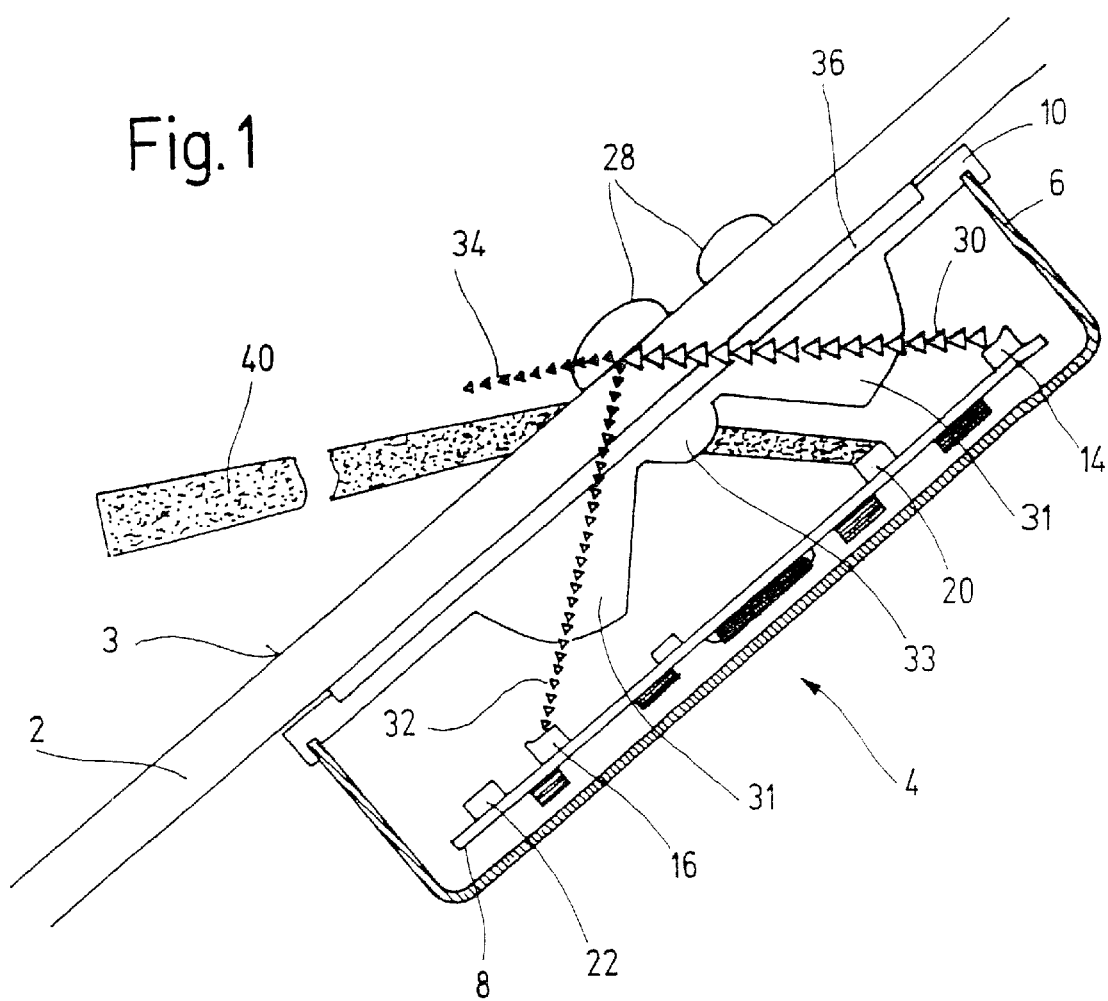
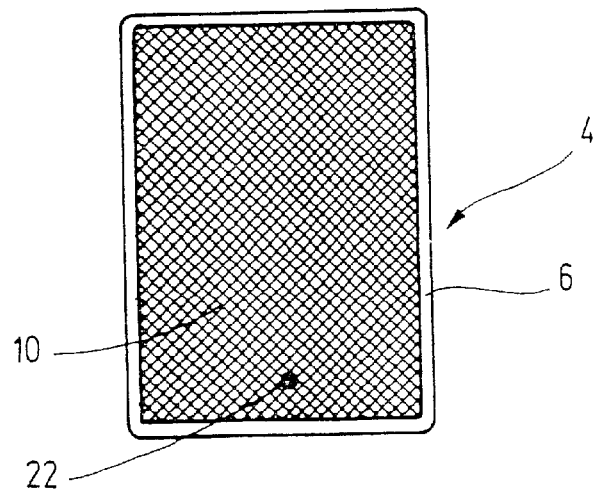

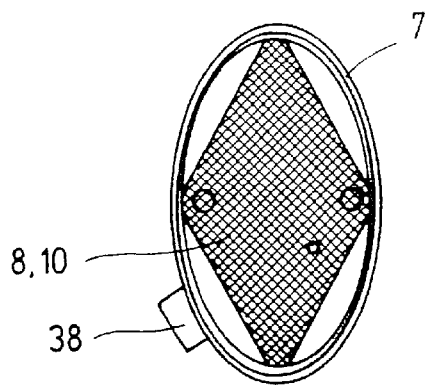
Fig. 3
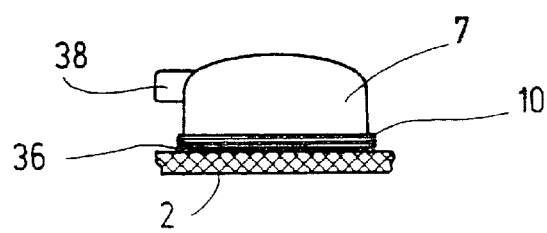
Fig. 4
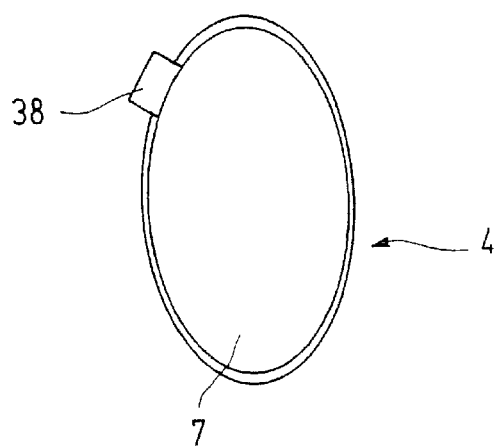
Fig. 5
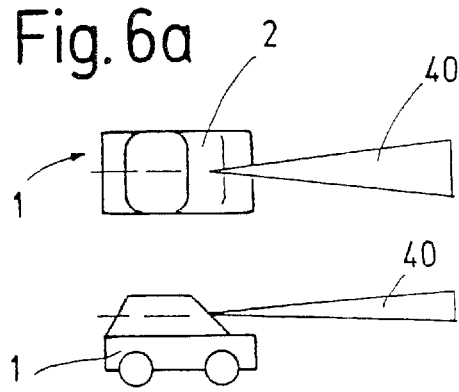
Fig. 6a
Fig. 6b
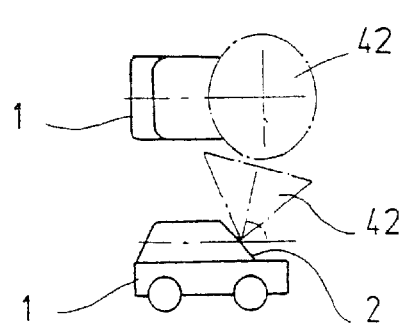
Fig. 6c
Fig. 6d

OPTICAL SENSOR

The invention relates to an optical sensor having the characteristics recited in the preamble to claim 1.

PRIOR ART

Windshield wiper systems for windshields of motor vehicles are known in which control of the windshield wipers is effected not only via a manually actuatable lever on the steering column but in addition via an optical rain sensor. The optical rain sensor includes a light source, whose electromagnetic radiation is reflected differently by the windshield depending on the film of moisture on the windshield. The proportion reflected, i.e., the reflected portion, is detected by means of a photo element, so that an output signal of the rain sensor can be furnished that corresponds to the film of moisture. These output signals can be evaluated and used to control the windshield wipers in such a way that both turning on the windshield wiper system and a wiper speed can be varied as a function of a detected wetting of a windshield.

Systems for automatically turning on a light system in the motor vehicle are also known. By measuring an output signal of a photo element, a conclusion is drawn about ambient brightness of the motor vehicle, and as a function thereof, the vehicle lights are turned on without anyaction on the part of a driver.

ADVANTAGES OF THE INVENTION

The optical sensor according to the invention, having the characteristics recited in claim 1, has the advantage in particular of furnishing a combined sensor for controlling the vehicle equipment that is important to a driver and improves his vision. Along with a rain sensor for controlling a windshield wiper system, a sensor for detecting outdoor brightness is integrated with the optical sensor, so that as a function of the measured ambient brightness, a light system can be turned on and off, and as a function of wetting of the windshield by precipitation, the windshield wiper system can automatically be triggered.

In a preferred feature of the invention, from the detected view-affecting parameters, namely essentially precipitation in the form of rain, fog or snow, as well as the ambient brightness, a combined control of the windshield wiper system and the light system can be achieved. For instance in heavy rain, on the one hand, it may be appropriate to turn on not only the windshield wipers but also the vehicle headlights. When it is dark, on the other hand, because of the greatly increased risk of glare from headlights of oncoming vehicles, however, it is even more important than during the day to keep the windshield free of wetness at all times. It is therefore appropriate when it is dark to provide for increased sensitivity of the windshield wiper controller to even slight degrees of wetting of the windshield. A switchover of the rain sensor sensitivity for triggering the windshield wiper system can be preferably varied by means of a signal formed by an ambient light sensor.

A combination of a rain sensor and an outdoor light sensor in one common optical sensor furthermore has the advantage of considerable simplification of its installation and assembly, which moreover means a cost reduction. By mounting all the electronic and optoelectronic components on a common printed circuit board, preferably using the SMD (surface mounted device) technique, very compact sensors can be made that can also be installed without difficulty in the vehicle. Such an optical sensor can thus be equally compact as known rain sensors, and like them, it can be mounted for instance behind an inside rear view mirror, on the inside of the windshield.

In a preferred feature of the invention, along with a brightness sensor for ambient light, which furnishes a signal that is largely affected by daylight and correspondingly has a relatively wide and preferably upward-oriented opening cone for incident light, at least one additional remote sensor is provided, which has a narrow opening cone preferably pointing forward in the direction of travel. As a result, this remote sensor is capable, with relatively high reliability, of detecting tunnel entrances or underpasses and thus of furnishing an early signal for turning on the vehicle lighting.

The focusing of the incident light can be done advantageously by means of an optical waveguide that at the same time functions as a base plate for the sensor housing. Such an optical waveguide may for instance be made from a plastic such as PMMA (polymethyl methacrylate) by injection molding, and then optical structures such as focusing lenses can be incorporated in the molding process in a simple way.

The connection with the windshield can be realized either by means of a frame on the window and a sensor housing clipped into the frame, or in a very simple way by means of a double-sided self-adhesive transparent film.

In a further preferred feature, additional control functions can be implemented, such as turning on fog headlights. By means of a suitably sensitive rain sensor, this sensor can detect the droplet size and can thus distinguish whether the wetting of the window is due to rain, fog, or snow. In heavy fog or in snow, along with the windshield wipers the fog headlights and/or the fog taillights can be turned on as well, thus further increasing driving safety. In fog, for instance, precipitation comprising superfine droplets on the windshield can be detected by the rain sensor. By suitable design of software for evaluating the rain sensor signals, the turning on of individual components of the light system (fog lights, fog taillights) can then be tripped.

In a preferred feature of the invention, it is provided that both the receiver of the rain sensor and at least one of the receivers of the ambient brightness sensor and/or of the remote sensor are formed by a common photo element. As a result, the expense for optoelectronic components to be used for the combined rain sensor and outdoor light sensor of the motor vehicle can be reduced. The receiver can thus take on a dual function for furnishing trigger signals for both the windshield wiper system and for the light system of the motor vehicle. In particular, it is preferred if an optical waveguide of the optical sensor has structures that take on corresponding focusing of the electromagnetic waves to be sensed onto the common photo element. Thus, by simple means, both the ambient brightness and the wetting of the windshield can be sensed.

In a further preferred feature of the invention, it is provided that the transmitting diode of the rain sensor can be triggered in clocked fashion. As a result, the common receiver can associate the received signals with either the rain sensor function or the automatic light control function of the optical sensor, in accordance with a duty cycle of the clocked triggering.

Further preferred features of the invention will become apparent from the other characteristics recited in the dependent claims.

DRAWINGS

Figure 8:
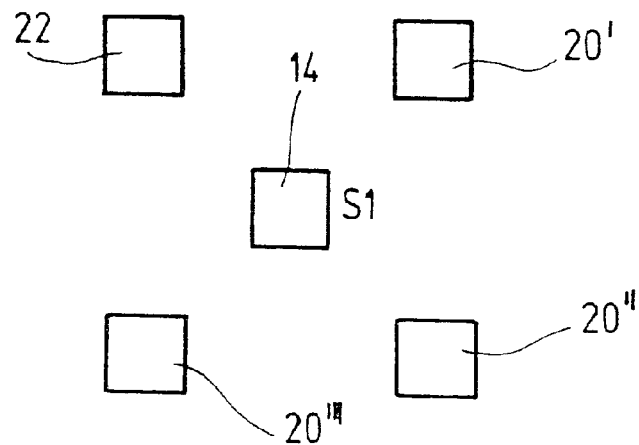
Figure 9:
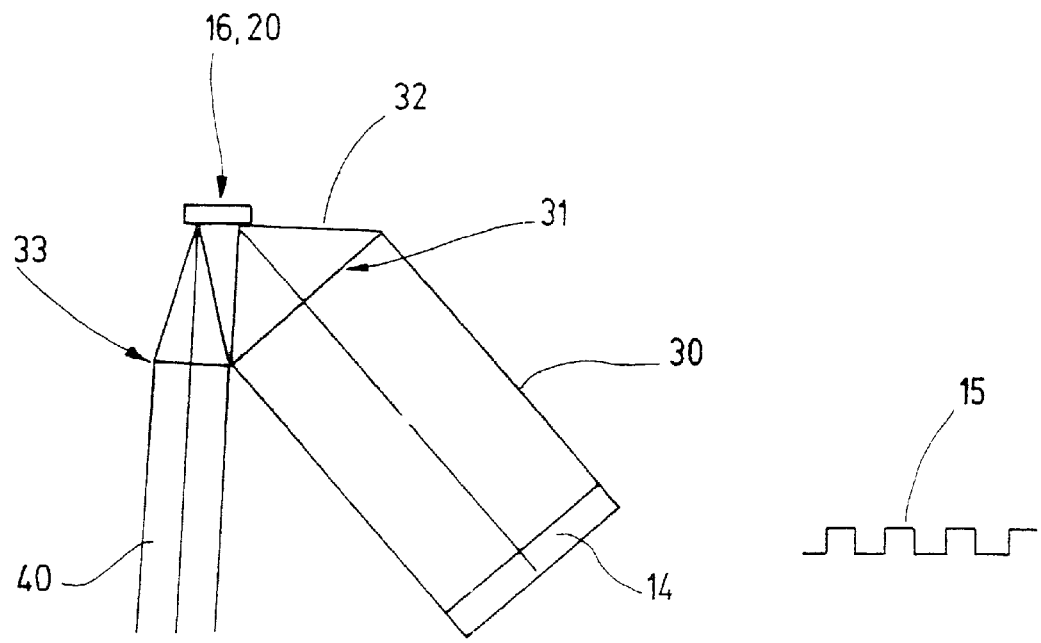
Figure 10:
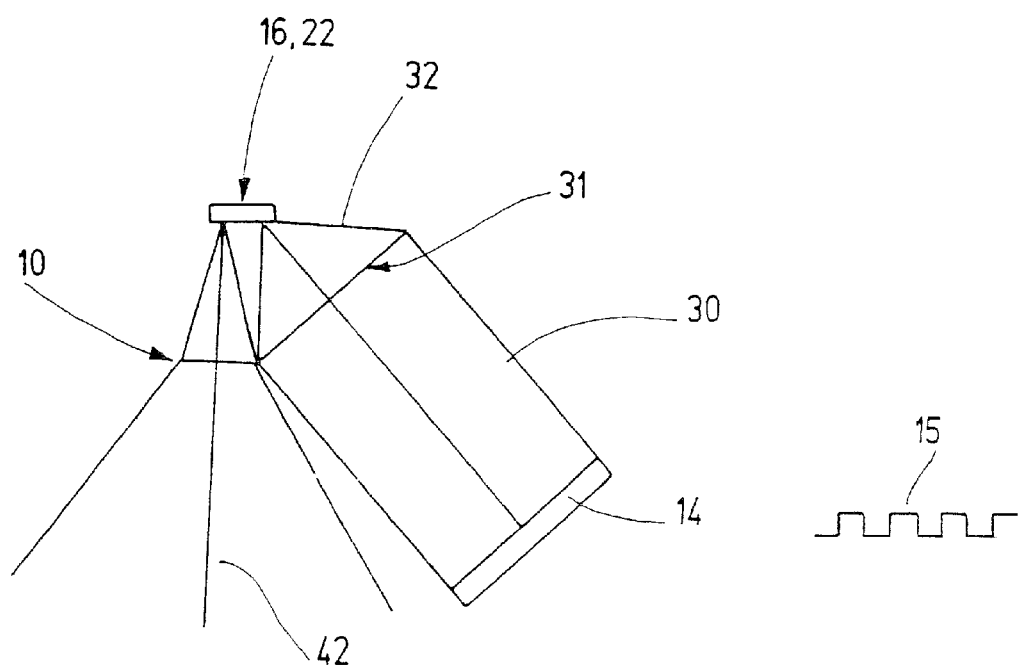

The invention will be described in further detail below in terms of exemplary embodiments in conjunction with the associated drawings. Shown are:

FIG. 1, a schematic sectional view through an optical sensor of the invention;

FIG. 2, a schematic plan view on the optical sensor;

FIG. 3, an alternative embodiment of the optical sensor of the invention;

FIG. 4, the optical sensor of FIG. 3, in a side view;

FIG. 5, the optical sensor of FIG. 3 in a plan view;

FIGS. 6a–6d, different opening angles of the remote sensor and the ambient light sensor, in schematic basic illustrations;

FIGS. 7 and 8, possible variance of the outfitting of the optical sensor; and FIGS. 9 and 10, schematic variant embodiments of individual components of the sensor.

DESCRIPTION OF THE EXEMPLARY EMBODIMENTS

FIG. 1, in a schematic sectional view, shows an optical sensor 4 according to the invention, which is secured on the inside to a windshield 2 of a motor vehicle. Mounting the optical sensor 4 behind the windshield 2 can be done for instance by adhesive bonding, at the level of an inside rear view mirror, not shown here. With positioning of this kind, there is no additional hindrance to the view of the driver. Optical and electronic components of the optical sensor 4 are enclosed by a housing 6, which is opaque toward the inside, or in other words toward the passenger compartment.

In the housing 6, there is a printed circuit board 8, on which the optical and electronic components are mounted, for instance by SMD (surface mounted device) technology. An LED (light-emitting diode) 14 mounted on the top side of the circuit board 8 can be seen. It emits visible or infrared light in the form of an oriented beam of light 30, which strikes the windshield 2 at an acute angle and because of the index of refraction of the windshield is normally reflected completely at the outer boundary face 3 of the windshield and the air and thus nearly completely, as a reflected portion 32, strikes a photodiode 16, which is also mounted on the top side of the circuit board 8. The LED 14 and the photo diode 16 are positioned on the circuit board 8 in such a way that the reflected portion 32 strikes the photo diode 16 by the laws of optics in accordance with the light refraction. If a water droplet 28 is on the outside of the windshield 2 at the location of reflection of the beam of light 30, then at the outer boundary face 3 of the window and the air an altered refraction behavior results, and as a result, the beam of light 30 is not reflected completely at the boundary face 3; instead, a scattered portion or component 34 emerging toward the outside is created. The thereby attenuated signal of the reflected portion 32 can be detected by the photo diode 16 and evaluated quantitatively by an electronic evaluation system and thus detected as a film of moisture or rain on the outside of the windshield 2 of the motor vehicle 1.

The desired focusing of the light beam 3 or of the reflected portion 32 can expediently be achieved by means of a suitably shaped optical waveguide 10, comprising a highly transparent, readily injection molded plastic, such as PMMA, which at the same time forms the bottom side of the housing 6 and is joined superficially to the windshield 2 via a transparent adhesive film 36. By suitable shaping, preferably by injection molding, the optical waveguide 10 can be given integrally formed lens-like structures 31, which provide for the desired focusing or parallelizing of the divergent light emitted by the LED 14 and of the light components detected by the photo diode 16.

Also disposed on the circuit board 8 is an ambient light sensor 22, which can detect the brightness of ambient light falling from outside through the windshield 2 of the motor vehicle 1 and can generate a control signal, dependent on this brightness, for automatically controlling the lights in the motor vehicle. The ambient light sensor 22 expediently reacts to sunlight, so that in this way the vehicle headlights are not unintentionally turned off in brightly lighted tunnels or underpasses that have strong artificial light sources.

A remote sensor 20 can also be seen, which has a relatively small opening cone 40 for incident light and is preferably suited for early detection of tunnel entrances or similar dark passages to be expected. For focusing the light component that reaches the remote sensor 20, an integrally molded lens structure 33 is again provided in the optical waveguide 10.

FIG. 2 shows a schematic plan view on the optical sensor 4 of the invention, which in this exemplary embodiment is accommodated in a rectangular housing 6. In this view, vertically from outside through the windshield 2 of the motor vehicle 1, what can be seen of the optical sensor 4 is the optical waveguide 10 with the enveloping housing edge. A cutout can also be seen, which allows light to pass through to the ambient light sensor 22.

FIG. 3 shows an alternative embodiment of the optical sensor 4, with an oval housing 7 and a rhomboid circuit board 8 that fits it and is accommodated in it, as well as an also rhomboid or trapezoidal light passage with focusing structures molded in it. Once again, an optical waveguide 10 for the ambient light sensor 22 and/or for the at least one remote sensor 20 can be seen, but these sensors are not visible from outside in this view.

FIG. 4 shows the optical sensor 4 of FIG. 3 in a schematic side view. Elements identical to those of the preceding figures are provided with the same reference numerals and will not be explained again. The housing 7 can be seen with a slightly upward-curved cap and a plug 38 extended to the outside at the side for electrical connection to an electronic evaluating system, not shown here. Instead of having an electrical connection to a central evaluation and/or control unit via the plug 38, it is also possible to perform optical signal transmission by means of optical waveguides.

The optical waveguide 10 with the focusing structures mounted on it at the same time forms the base plate for the housing 7, which is glued superficially via the transparent adhesive foil 36 to the inside of the windshield 2 of the motor vehicle 1. The optical waveguide 10 is embodied such that all the optical structures for both the rain sensor 14, 16 and the brightness sensors 20, 22 are contained in it. For instance, if infrared light is used for the rain sensor, then the regions for the rain sensor function may be of black plastic. The regions of the optical waveguide 10 necessary for the brightness sensors 20, 22 are then expediently made of transparent plastic. To that end, the optical waveguide 10 can either be produced by so-called two-color injection molding or it can for instance be put together from a plurality of plastic segments that are each of a single color.

FIG. 5 again for the sake of clarity shows a plan view onto the top of the curved housing cap 7 of the optical sensor 4 with the plug 38 extended to the outside at the side.

In FIGS. 6a–6d, different opening cones for the remote sensor 20 and for the ambient light sensor 22 of the optical sensor 4 are shown in schematic views.

FIG. 6a shows a schematic plan view on a motor vehicle 1 with a windshield 2. A relatively acute-angled opening cone 40 in the direction of vehicle travel can be seen here for the remote sensor 20, which can assure that only dark portions located directly in the direction of vehicle travel are detected.

FIG. 6b, in a side view on the motor vehicle 1 corresponding to FIG. 6a, shows the opening angle 40, which has an even smaller opening angle in the vertical direction than in the horizontal direction.

FIG. 6c, conversely, in a plan view shows a relatively wide opening cone 42 for the ambient light sensor 22, which makes it possible for the light components that arrive primarily from the top to be reliably detected and evaluated as ambient brightness.

FIG. 6d, in a side view, shows the substantially upward-pointing opening cone 42.

In FIGS. 7 and 8, each purely schematically, possible variants in outfitting the optical sensor 4 are shown. In the variant shown in FIG. 7, the optical sensor 4 can have the remote sensor 20 the ambient light sensor 22, and two transmitter diodes 14. With respect to the function of the individual components, one may refer to the description of the preceding drawing figures. Providing two transmitter diodes 14 makes it possible to increase the accuracy of the evaluation of the rain sensor signal. The transmitter diodes 14 can each act upon one region, spaced apart from one another, of the windshield 2 with a beam of light, so that wetting of the windshield can be verified. If only one transmitter diode 14 were provided, then even a single droplet could lead to tripping of the rain sensor function. Providing two transmitter diodes 14 makes it possible to check whether merely a single droplet has coincidentally reached precisely the detection region of one transmitter diode 14, or by monitoring spaced-apart regions, whether the second region has also been wetted with a droplet of moisture. The likelihood of a statement that such wetting of the windshield has in fact occurred and requires activating the windshield wiper system can thus be increased.

According to the outfitting variant shown in FIG. 8, along with a transmitter diode 14 and an ambient light sensor 22, it is provided that the optical sensor 4 has a total of three remote sensors 20', 20'', and 20'''. Each of the remote sensors 20', 20'', and 20''' can point in a different direction, with a correspondingly narrow opening cone 40 (FIGS. 6a, 6b). As a result, it becomes possible, for instance when cornering, to provide early detection of tunnel entrances or the like that appear relatively suddenly. This improves the function and convenience of the optical sensor 4. It is clear that in accordance with the outfitting variance shown in FIGS. 7 and 8, the circuit board 8 and the optical waveguide 10 both have a suitably adapted design and structuring.

In FIGS. 9 and 10, variant embodiments are schematically shown in which individual components of the sensor 4 are used jointly for both the rain sensor function and the automatic light control function. The reference numerals used in FIGS. 9 and 10 refer to the explanations of the preceding FIGS. 1 through 8.

In FIG. 9, it is provided that the receiver 16 of the rain sensor at the same time forms the remote sensor 20. This economizes on one optical component, namely a photo diode, compared with the variant embodiment shown in FIG. 1. To achieve this economy, the optical structures, by which the focusing or deflection of the electromagnetic waves is effected, are oriented in such a way that the beams 32 reflected by the windshield 2 strike the receiver 16, 20, as do the electromagnetic waves for the remote sensor that are sensed via the structure 33 of the optical waveguide 10 in the opening cone 40. The receiver thus assumes a quasi-dual function. To make this possible, it is provided that the transmitter diode 14 be triggered in clocked fashion—as suggested by a signal course 15. In accordance with a duty cycle of the signal 15, the transmitter diode 14 is induced to broadcast the electromagnetic waves 30 in pulsed form. If the evaluation circuit is informed of this duty cycle, then this circuit can unequivocally associate the signals received by the receiver 16, 20 with the transmitter 14, or any electromagnetic waves arriving in the opening cone 40 with the ambient brightness. This makes it possible to evaluate both the rain sensor function and the remote sensor function either jointly or separately with the evaluation circuit, and to make the decision as to whether the windshield wiper system and/or the light system of the motor vehicle should be put into operation.

In the schematic view shown in FIG. 10, it is indicated that the coupling, provided in FIG. 9, of the function of the receiver 16, 20 for the rain sensor and the remote sensor is understood to be usable as well for coupling the rain sensor and the ambient light sensor. To that end, the optical waveguide 10, which detects the opening cone 42, is structured in such a way that the focused electromagnetic waves are also deflected onto the receiver 16, 22. This accordingly makes it possible to economize on one photo element, since now only one common photo element 16, 22 is needed for both the rain sensor function and the ambient brightness sensor function.

What is claimed is:

1. An optical sensor for motor vehicles, for detecting ambient parameters that affect vision, having at least one transmitter and at least one receiver for electromagnetic waves (light waves), in which a windshield is disposed in a measurement segment between the at least one transmitter and the at least one receiver and influences a wave propagation between the at least one transmitter and the at least one receiver in such a way that when a film develops on the windshield, and especially when wetting occurs from precipitation, an output signal generated by the receiver varies and serves to trigger a windshield wiper system, characterized in that at least one of the receivers (16, 20, 22) of the optical sensor (4) receives electromagnetic waves (light waves) of an ambient brightness of the motor vehicle and serves to trigger a light system of the motor vehicle, wherein at least one of said at least one receiver is an ambient light sensor (22), said ambient light sensor (22) sensing an opening angle of approximately 40°, with an opening direction obliquely upward in terms of the vehicle travel direction, and wherein at least one of said at least one receiver is a remote sensor (20), said remote sensor (20) sensing an acute opening angle, with an opening direction that is horizontal and in the vehicle travel direction.

2. The optical sensor of claim 1, characterized in that the optical sensor (4) furnishes a common output signal, dependent on the wetting of the windshield and on the ambient brightness, to a downstream evaluation circuit, which serves to trigger the windshield wiper system and the light system.

3. The optical sensor of claim 1, characterized in that the at least one transmitter is an LED (14).

4. The optical sensor of claim 3, characterized in that the first receiver, which detects the optical signal emitted by the at least one LED (14), is a photo diode (16).

5. The optical sensor of claim 1, characterized in that the optical sensor (4) is provided with an optical waveguide (10), with lens structures (31, 33) incorporated in it for focusing light.

6. The optical sensor of claim 1, characterized in that the at least one remote sensor (20) senses an opening angle of approximately 7°.

7. The optical sensor of claim 1, characterized in that the at least one remote sensor (20) and the at least one ambient light sensor (22) are sensitive to ultraviolet light, especially sunlight.

8. The optical sensor of claim 1, characterized in that an automatic day/night switchover of the rain sensor sensitivity is effected by means of the ambient light sensor.

9. The optical sensor of claim 1, characterized in that the receiver (16) of the at least one remote sensor (20) and/or the ambient light sensor (22) are formed by a photo element.

10. The optical sensor of claim 9, characterized in that the optical waveguide (10) has structures (31, 33), which focus the electromagnetic waves (30, 32) of the LED (14) and the electromagnetic waves arriving in the opening angle (42 and/or 40) onto the common photo element (16, 20, 22).

11. The optical sensor of one of claims 9, characterized in that the LED (14) is triggerable with a clocked signal (15).

12. The optical sensor of claim 1, characterized in that the electronic components of the optical sensor (4) are mounted on a common circuit board using surface mounting device (SMD) technology.

13. The optical sensor of claim 1, characterized in that the optical sensor (4) is mounted in an oval plug housing (7).

14. The optical sensor of claim 1, characterized in that the optical waveguide (10) forms the base plate, joined superficially to the windshield (2) of the plug housing (6, 7).

15. The optical sensor of claim 1, characterized in that the circuit board (8) has a trapezoidal or rhomboid contour.

16. The optical sensor of claim 1, characterized in that the optical waveguide (10) has a trapezoidal or rhomboid contour.

17. The optical sensor of claim 1, characterized in that a transmission of the sensor data is effected by means of a data line to a central evaluation and/or control unit, and the data line is effected with electrical or optical signal transmission.

18. The optical sensor of claim 1, characterized in that only a single optical waveguide (10), with adequate transparency for both optical functions, is provided.

19. The optical sensor of claim 1, characterized in that if IR (infrared) light is used, the optical waveguide (10) for the rain sensor function is of black plastic.

20. The optical sensor of claim 1, characterized in that for the receiver (20, 22), optical regions in the optical waveguide (10) that are of transparent (clear) plastic are provided, which allow visible light to pass through them.

21. The optical sensor of claim 1, characterized in that the optical waveguide (10) comprises a plastic part made by two-color injection molding.

22. The optical sensor of claim 1, characterized in that the optical waveguide (10) can be produced by combining two single-color plastics.

23. The optical sensor of:one of the foregoing claims, characterized in that the optical sensor (4) is glued from the inside to the windshield (2).

24. The optical sensor of claim 1, characterized in that the optical sensor (4) is joined to the windshield (2), in particular clipped or clamped, via a fastening frame.

25. The optical sensor of claim 1, characterized in that a transparent double-sided adhesive film (36) is provided as bonding between the windshield (2) and the optical waveguide (10) of the optical sensor (4).

26. The optical sensor of claim 1, characterized in that in fog, both the windshield wipers and the fog headlights are turned on.

27. The optical sensor of claim 1, characterized in that in heavy fog, both the windshield wipers and the fog headlights and/or the fog taillights are turned on.

* * * * *